United States Patent
Shackelford et al.

(10) Patent No.: US 11,256,716 B2
(45) Date of Patent: Feb. 22, 2022

(54) VERIFYING MIRRORING OF SOURCE DATA UNITS TO TARGET DATA UNITS

(71) Applicant: INTERNATIONAL BUSINESS MACHINES CORPORATION, Armonk, NY (US)

(72) Inventors: David Michael Shackelford, Tucson, AZ (US); Nadim P. Shehab, Tucson, AZ (US); John G. Thompson, Tucson, AZ (US); Eduard Aaron Diel, Tucson, AZ (US); Anthony H. Giang, Phoenix, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 253 days.

(21) Appl. No.: 16/446,611

(22) Filed: Jun. 19, 2019

(65) Prior Publication Data

US 2020/0401604 A1 Dec. 24, 2020

(51) Int. Cl.
*G06F 16/27* (2019.01)
*G06F 16/23* (2019.01)

(52) U.S. Cl.
CPC ........ *G06F 16/273* (2019.01); *G06F 16/2365* (2019.01)

(58) Field of Classification Search
CPC ............................ G06F 16/273; G06F 16/2365
USPC ......................................................... 707/613
See application file for complete search history.

(56) References Cited

U.S. PATENT DOCUMENTS

| | | | |
|---|---|---|---|
| 8,478,958 B2 | 7/2013 | Kano | |
| 8,914,597 B2 | 12/2014 | Benhase et al. | |
| 9,454,315 B2 | 9/2016 | Dain et al. | |
| 9,864,517 B2* | 1/2018 | Labiaga | G06F 3/0659 |
| 2005/0210320 A1* | 9/2005 | Vincent | G06F 11/2071 |
| | | | 714/11 |
| 2006/0010299 A1* | 1/2006 | Zhang | H04L 67/1097 |
| | | | 711/162 |
| 2006/0036648 A1* | 2/2006 | Frey | G06F 3/067 |
| 2012/0131391 A1* | 5/2012 | Musolff | G06F 3/0647 |
| | | | 714/48 |

(Continued)

OTHER PUBLICATIONS

"I/O Priority Management for Copy Services Relationships", IP.Com, IP.com No. IPCOM000198983D, Aug. 19, 2010, pp. 5.

(Continued)

*Primary Examiner* — Dung K Chau
(74) *Attorney, Agent, or Firm* — Konrad Raynes Davda & Victor LLP; David W. Victor

(57) ABSTRACT

Provided are a computer program product, system, and method verifying mirroring of source data units to target data units. Source data units in a source storage are mirrored to corresponding target data units in a target storage. The source data units are read to compare to corresponding mirrored target data units. The read source data units that did not match the corresponding target data units are saved in source version data. The source data units that were read and did not match the corresponding target data units are read. The mirroring of the source data units are verified in response to determining that for each mirrored source data unit, one of a read source data unit and the read source data unit saved in the source version data matches the corresponding target data unit.

20 Claims, 4 Drawing Sheets

(56) References Cited

U.S. PATENT DOCUMENTS

2016/0342490 A1* 11/2016 Deguchi ................ G06F 3/065
2018/0210773 A1* 7/2018 McBride ............ G06F 11/2082

OTHER PUBLICATIONS

"Verification Of The Temporal Synchronization Between Like Database Objects Across Two or More Concurrent, But Discrete, Systems", IP.Com, IP.com No. IPCOM000234048D, Jan. 9, 2014, pp. 6.

J. Tate, et al., "IBM System Storage SAN Volume Controller and Storwize V7000 Best Practices and Performances Guidelines", IBM Corporation, IBM Red Books, Document No. SG24-7521-05, May 2018, pp. 448.

"Non-chronological Version Control System for Multiple Files", IP.Com, IP.com No. IPCOM000252666D, Feb. 1, 2018, pp. 4.

* cited by examiner

VERIFYING MIRRORING OF SOURCE DATA UNITS TO TARGET DATA UNITS

BACKGROUND OF THE INVENTION

1. Field of the Invention

The present invention relates to a computer program product, system, and method verifying mirroring of source data units to target data units.

2. Description of the Related Art

Data backup systems can provide continuous availability of production data in the event of a sudden catastrophic failure at a single point in time or data loss over a period of time. In one such disaster recovery system, production data is replicated from a local site to a remote site which may be separated geographically by several miles from the local site. Such dual, mirror or shadow copies are typically made in a secondary (or target) storage device at the remote site, as the application system is writing new data to a primary (or source) storage device usually located at the local site. Different data replication technologies may be used for maintaining remote copies of data at a secondary site, such as International Business Machine Corporation's ("IBM") Metro Mirror Peer to Peer Remote Copy (PPRC), Extended Remote Copy (XRC), Coupled XRC (CXRC), Global Copy, and Global Mirror.

For an asynchronous mirroring operation, successful updates to the primary storage are typically reported to a host system updating the primary storage as a successful storage I/O operation without waiting for the update to be mirrored to the secondary storage. As a result, the host need not wait for the updated data to be mirrored before continuing with operations.

Current systems may run a verification program periodically in a system separate from the source and target storage servers to determine whether asynchronous mirroring is operating successfully by reading source data units and comparing to the target data units in the target or secondary storage that are in a mirror copy relationship. If there is a match for the data being mirrored, then the mirror operation is verified as successfully operating. If the comparison does not match, then the verification operation will continue to reread the source and target data to compare with the target data until matches are determined. If no match is determined after a predetermined number of reread attempts, then the mirroring operation cannot be verified.

There is a need in the art for improved techniques for verifying the operation of a data mirroring with respect to data in a mirror copy relationship.

SUMMARY

Provided are a computer program product, system, and method verifying mirroring of source data units to target data units. Source data units in a source storage are mirrored to corresponding target data units in a target storage. The source data units are read to compare to corresponding mirrored target data units. The read source data units that did not match the corresponding target data units are saved in source version data. The source data units that were read and did not match the corresponding target data units are read. The mirroring of the source data units are verified in response to determining that for each mirrored source data unit, one of a read source data unit and the read source data unit saved in the source version data matches the corresponding target data unit.

DETAILED DESCRIPTION

When performing a verification operation to verify whether a mirroring of data, such as asynchronous mirroring, is operating properly by reading source data to compare to target data, even if the mirror copy operation is operating correctly, matches may not occur if the source data is constantly being updated. In such situations, if the updated source data is read and compared to the target data not yet updated by the mirroring, then the target data will not match and the mirroring cannot be verified even if operating properly.

Described embodiments provide improvements to data mirroring computer technology by saving read source data units in source version data that did not match the corresponding target data units during the verification procedure. Upon rereading source data units that were read and did not match the corresponding target data units during a previous iteration of the verify operation, the mirroring of the source data units reread is verified in response to determining that for each mirrored source data unit, one of a read source data unit and the read source data unit saved in the source version data matches the corresponding target data unit. If the update to the source data unit has not yet been mirrored, then the target data unit will not match the currently read corresponding source data unit during a subsequent verify iteration, but would match a previously read source data unit before the update stored in the source version data. In this way, the described embodiments allow verification of mirroring for updated source data units not yet mirrored by saving previously read source data units to compare with target data units not yet updated.

Figure 1:
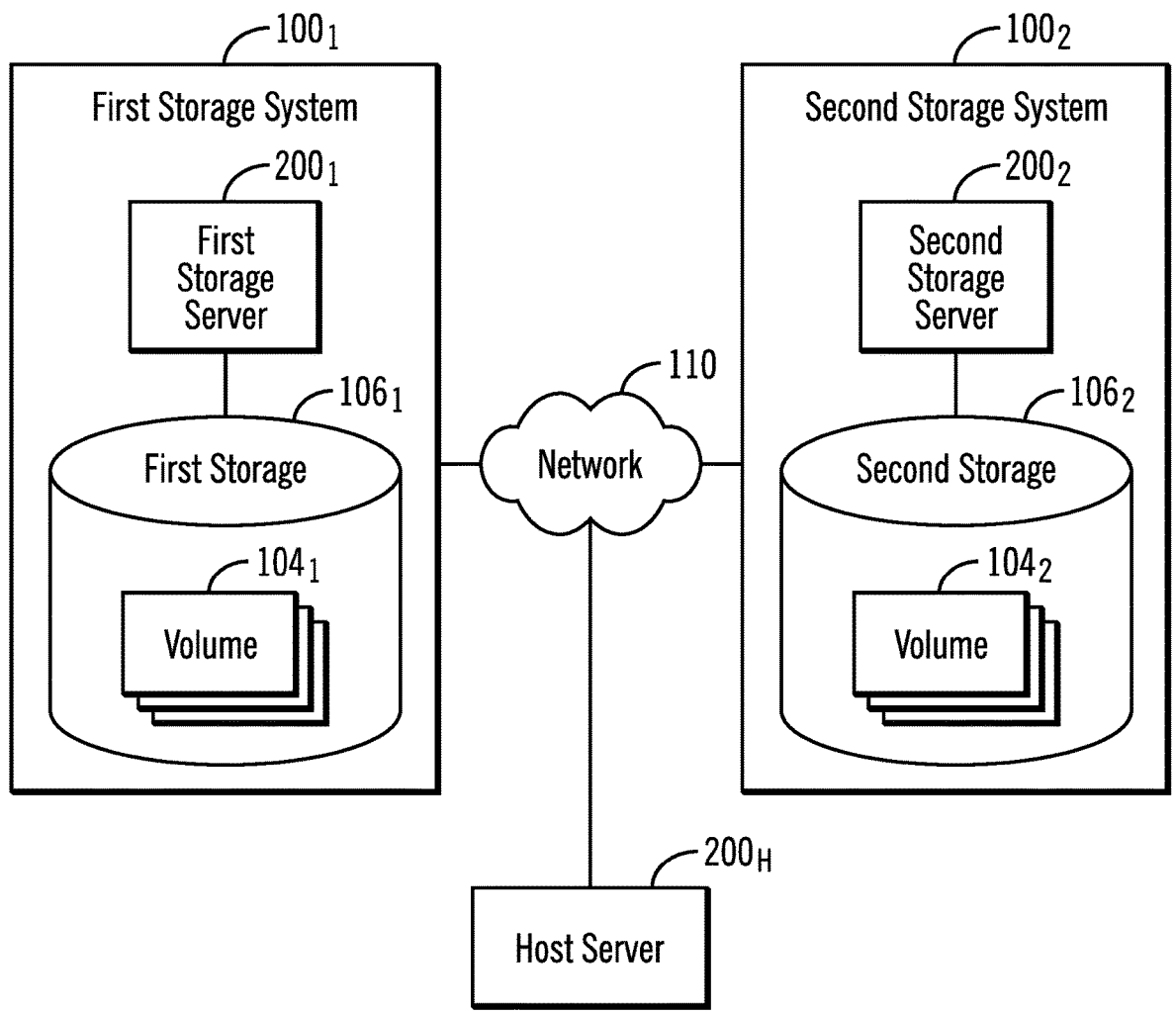
FIG. 1 illustrates an embodiment of a storage environment.

FIG. 1 illustrates an embodiment of a data storage environment having at least two storage systems $100_1$ and $100_2$, each including storage servers $200_1$ and $200_2$, respectively, managing access to volumes $104_1$ and $104_2$ configured in storages $106_1$ and $106_2$. A host server $200_H$ manages data mirroring and data verification operations for data mirrored from the first storage system $100_1$ to the second storage system $100_2$. Host systems (not shown) may perform read and write operations with respect to the first storage system $100_1$ over a storage network 110. The first storage $106_1$, also referred to as a primary storage or source storage, may comprise a primary production volume to which hosts direct read and write request. The first storage server $200_1$ may mirror data in the volumes $104_1$ to the second storage system $100_2$, also referred to a secondary storage or target storage, to maintain data in consistency groups at the second storage server $200_2$.

The term "storage system" as used herein may refer to a storage server $200_1$, $200_2$ and/or the storage $106_1$, $106_2$ managed by the server.

The storages $106_1$, $106_2$ may comprise different types or classes of storage devices, such as magnetic hard disk drives, solid state storage device (SSD) comprised of solid state electronics, EEPROM (Electrically Erasable Programmable Read-Only Memory), flash memory, flash disk, Random Access Memory (RAM) drive, storage-class memory (SCM), etc., Phase Change Memory (PCM), resistive random access memory (RRAM), spin transfer torque memory (STM-RAM), conductive bridging RAM (CBRAM), magnetic hard disk drive, optical disk, tape, etc. The volumes $104_1$, $104_2$ may further be configured from an array of devices, such as Just a Bunch of Disks (JBOD), Direct Access Storage Device (DASD), Redundant Array of Independent Disks (RAID) array, virtualization device, etc. Further, the storages $106_1$, $106_2$ may comprise heterogeneous storage devices from different vendors and different types of storage devices, such as a first type of storage devices, e.g., hard disk drives, that have a slower data transfer rate than a second type of storage devices, e.g., SSDs.

The storage network 110 used by the storage systems $100_1$ and $100_2$ to mirror data may comprise a storage network such as one or more interconnected Local Area Networks (LAN), Storage Area Networks (SAN), Wide Area Network (WAN), peer-to-peer network, wireless network, etc.

Figure 2:
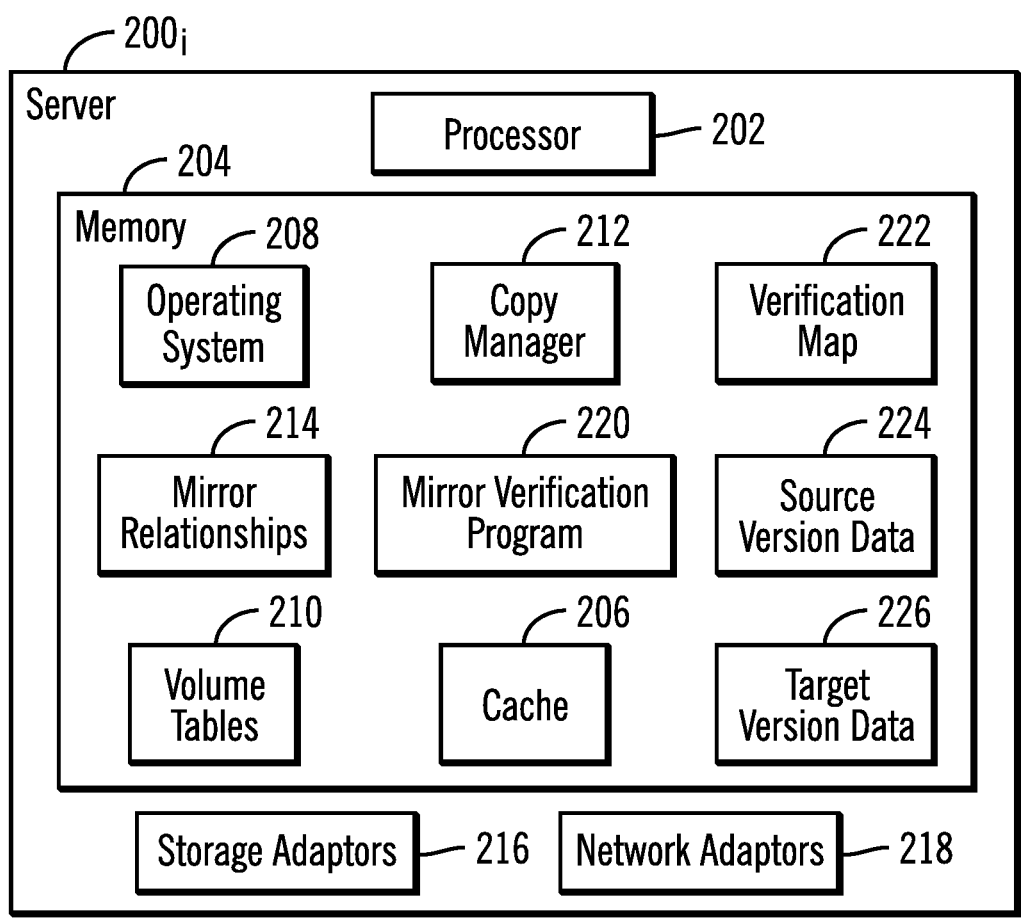
FIG. 2 illustrates an embodiment of components in a server in the storage environment of FIG. 1.

FIG. 2 provides an embodiments components of a server $200_1$ involved in data mirroring, including the first server $200_1$, second server $200_2$, and host server $200_H$, as including a processor 202 and a memory 204 including programs executed by the processor 202 as well as a cache 206 to cache read and write data for the first storage $106_1$. A portion of the cache 206 may also be used to transfer mirror data in a consistency group.

The memory 204 includes an operating system 208, which forms volumes $104_1$ and maintains volume tables 210, such as a volume table of contents (VTOC), file allocation table, etc., providing information on the configured volumes $104_1$. The operating system 208 further manages I/O requests with respect to the volumes $104_1$.

The memory 204 includes a copy manager 212 to create and manage mirror relationships 214 of source data units in volumes $104_1$ in the first storage system $100_1$, also referred to as source storage, to target data units in the second storage system $100_2$, also referred to as the target storage, as part of consistency groups. In one embodiment, the first storage system $100_1$ may have the source storage and the second storage system $100_2$ may have the target storage of mirror copy relationships to mirror source volumes or other data units to corresponding target volumes or data units.

The server $200i$ includes one or more storage adaptors 216 to communicate with devices in the storage $106_1$ and one or more network adaptors 218 to communicate with the network 110 and manage the transfer of source data being mirrored to target data in a mirror copy relationship.

FIG. 2 further shows components that may be included at the server or component performing the verification operations, e.g., host server $200_H$, including a mirror verification program 220 to verify whether the mirror relationship 214 is functioning properly; a verification map 222, such as a bitmap, used by the mirror verification program 220, to indicate whether mirroring has been verified with respect to source data units in the first storage $106_1$ mirrored to corresponding target data units $204_2$; source version data 224 to store versions of source data units read while verifying the mirroring operations; and target version data 226 to store versions of target data units read while verifying the mirroring operations.

A source data unit indicated in the verification map 222 may comprise any unit of data maintained in a volume $104_1$, such as a track, cylinder of tracks, extent, etc.

The source version data 224 and target version data 226 may be stored at a separate location from where the target data units are stored for the volumes $104_2$ in the second storage $106_1$, such as in a separate log file or side-file.

In one embodiment, the verification components 220, 222, 224, and 226 are implemented on the host server $200_H$ to verify that the mirroring is working. In an alternative embodiments, the verification components 220, 222, 224, and 226 may be maintained on the source server $200_1$, target server $200_2$ or other storage server, which is neither source nor target, such as an appliance for analyzing data, etc., to verify that the mirroring is working by reading target data units from the second storage $106_2$ to compare with corresponding source data units in the first storage $106_1$. In embodiments where the verification components are on the source $200_1$ or target $200_2$ server, the host server $200_H$ may still managing the mirroring operations.

The components in the memory 204, including 208, 212, 220, 222, 224, 226, are shown in FIG. 2 as program code loaded into the memory 204 and executed by the processor 202. Alternatively, some or all of the components functions may be implemented in hardware devices, such as in Application Specific Integrated Circuits (ASICs), Field Programmable Gate Array (FPGA) or executed by separate dedicated processors.

The memory 204 may comprise one or more memory devices volatile or non-volatile, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc.

Figure 3:
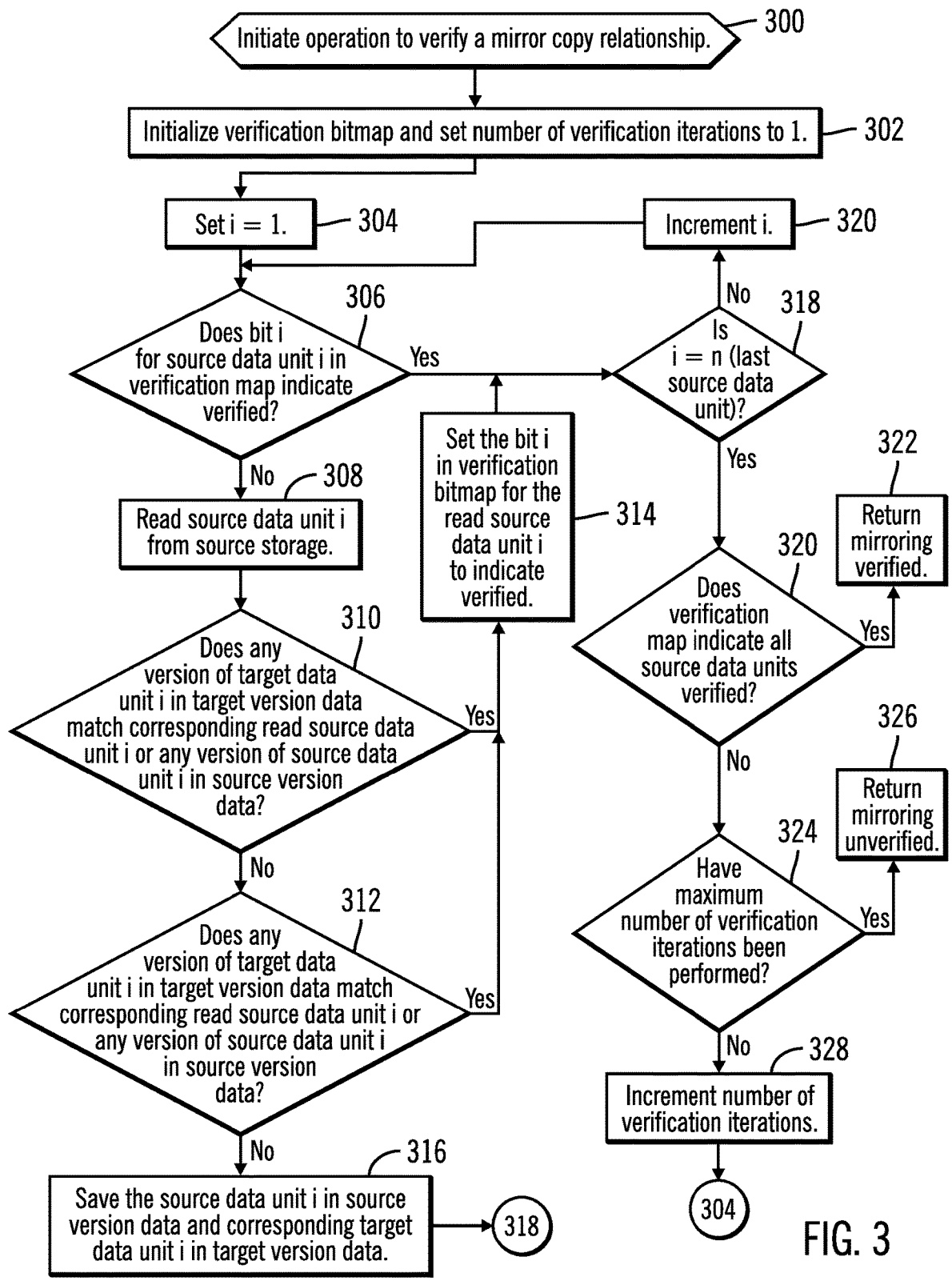
FIG. 3 illustrates an embodiment of operations to verify mirror copy operations for a copy relationship.

FIG. 3 illustrates an embodiment of operations performed by the mirror verification program 220, such as on the host server $200_H$ or other component in the network 110, to verify that the mirroring of a mirror relationship 214 is functioning properly. The verification may be performed for an entire volume or a subsystem identifier (SSID), comprised of multiple volumes in a Logical Subsystem (LSS) or other logical units of data. The verification operation may be performed during the mirroring of data as part of a mirror copy relationship 214 to verify that the mirroring is operating properly, as opposed to trying to verify specific data copied over. The verification operation may be performed periodically, such as during periods of low activity at the first storage $106_1$, where the mirroring may be infrequent due to infrequent updates at the volume $104_1$ in a mirror relationship 214. The verification program and operations of FIG. 3 may be initiated as part of a regularly scheduled verification operations, such as during periods of low activity, or initiated manually by a systems administrator.

Upon initiating (at block 300) an operation to verify a mirror copy relationship 214, the mirror verification program 220 initializes (at block 302) the verification bitmap 222 to indicate no source storage units have been verified and set a number of verification iterations to one. The mirror verification program 220 initiates an iteration of verification by setting (at block 304) the variable i to one. If (at block 306) the bit i in the verification map 222 for source data unit i indicates that the unit i was not verified, i.e., for that source data unit the data has not been confirmed as successfully mirrored, then the mirror verification program 220 reads (at block 308) the source data unit i from the source storage $106_1$, which is transmitted over the network 110 from the source storage system $100_1$ to the host server $200_H$, or other system. If (at block 310) the target data unit i does not match the read or saved version of the source data unit i, then the mirror verification program 220 determines (at block 312) whether any saved version of the corresponding target data unit i in the target version data 226 matches the corresponding read source data unit i or any version of the source data unit i saved in the source version data 224. The host server $200_H$, or other system, would also read the target data units from the target storage $106_2$ to verify.

If (at block 310 or 312) there is a match of a version of the source data unit i and any copied version of the corresponding target data unit i, then the bit i in the verification map 222 is set (at block 314) to indicate that mirroring has been verified for that source data unit i. If (at block 312) there is no match of any version of the target data unit i in storage $106_2$ or target version data 226 and the read or any version of the source data unit i, then the read source data unit i is saved (at block 316) in the source version data 224 and the corresponding target data unit i currently on the target storage $106_2$ is saved in the target version data 226.

If (at block 306) the bit i for the read source data unit i in the verification map 222 indicates that the read source data unit has already been verified as mirrored correctly or after saving the read source data unit i and the corresponding target data unit in version data 224, 226 (at block 316), control proceeds to block 318 to determine whether the variable i for the considered source data unit i is the last source data unit to consider in the mirror copy relationship 214. If i is not n, or not the last unit to consider, then i is incremented (at block 320) and control proceeds to back block 306 to verify mirroring for the next source data unit. If (at block 318) i equals n, for the last source data unit, then if (at block 320) the verification map 222 indicates all source data units are verified, i.e., all having a value set at block 314, then the mirror verification program 220 returns (at block 322) a message that mirroring was verified. If (at block 320) the verification map 222 indicates that not all source data units were verified and if (at block 324) the maximum number of verification iterations have been performed, then the mirror verification program 220 returns (at block 326) a message that mirroring is not verified, which may trigger the system administrator to further investigate why the mirroring operation is not successfully copying data or terminate mirroring. If (at block 324) the maximum number of mirroring operations have not been performed, then the number of verification iterations is incremented (at block 328) and control proceeds back to block 304 to begin another iteration of verification for all of the source data units, i=1 . . . n, in the volume or other logical device subject to the mirror relationship 214 being verified.

The embodiment of FIG. 3 performs a verification with respect to any version of the source and target data units created during the mirror copy relationship by saving different versions of source and target data units in source 224 and target 226 version data to consider when a source data unit is read from the source storage $106k$. In this way the verification procedure considers whether source data units were correctly copied from a current or early version of the source data to verify the individual source data units of the mirror relationship. This allows verification of mirror operations by confirming that any version of the source data units in the mirror successfully copied. Failure to verify mirror operations indicates that the copy manager 212 is not properly copying data or there are errors in the network 110.

In an alternative embodiment, only source version data 224 is maintained, and not target version data 226, so that the operation at block 312 is not performed. In this way, only versions of the source data units are compared to the target data units, and from the no branch of block 310, control proceeds to block 316.

In a further alternative embodiment, point-in-time information is provided with the read source data units, saved target data units in the target storage $106_2$, and saved source and target versions. In this way, the comparison of the read source data unit and the target data unit is made only for read or versioned source data units and target data units that have a same point-in-time, i.e., are part of a same consistency group, to avoid comparing source and target data units for different point-in-times that should not match. This embodiment reduces the number of comparison operations by only comparing versions of the source and target data units that are in a same consistency group.

In the described embodiments, the copy operation comprises a mirror copy operation, such as an asynchronous or synchronous mirror. In alternative embodiments, the copy operation may comprise another type of copy operation such as a point-in-time copy operation, such as a snapshot copy, etc.

The reference characters used herein, such as i, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
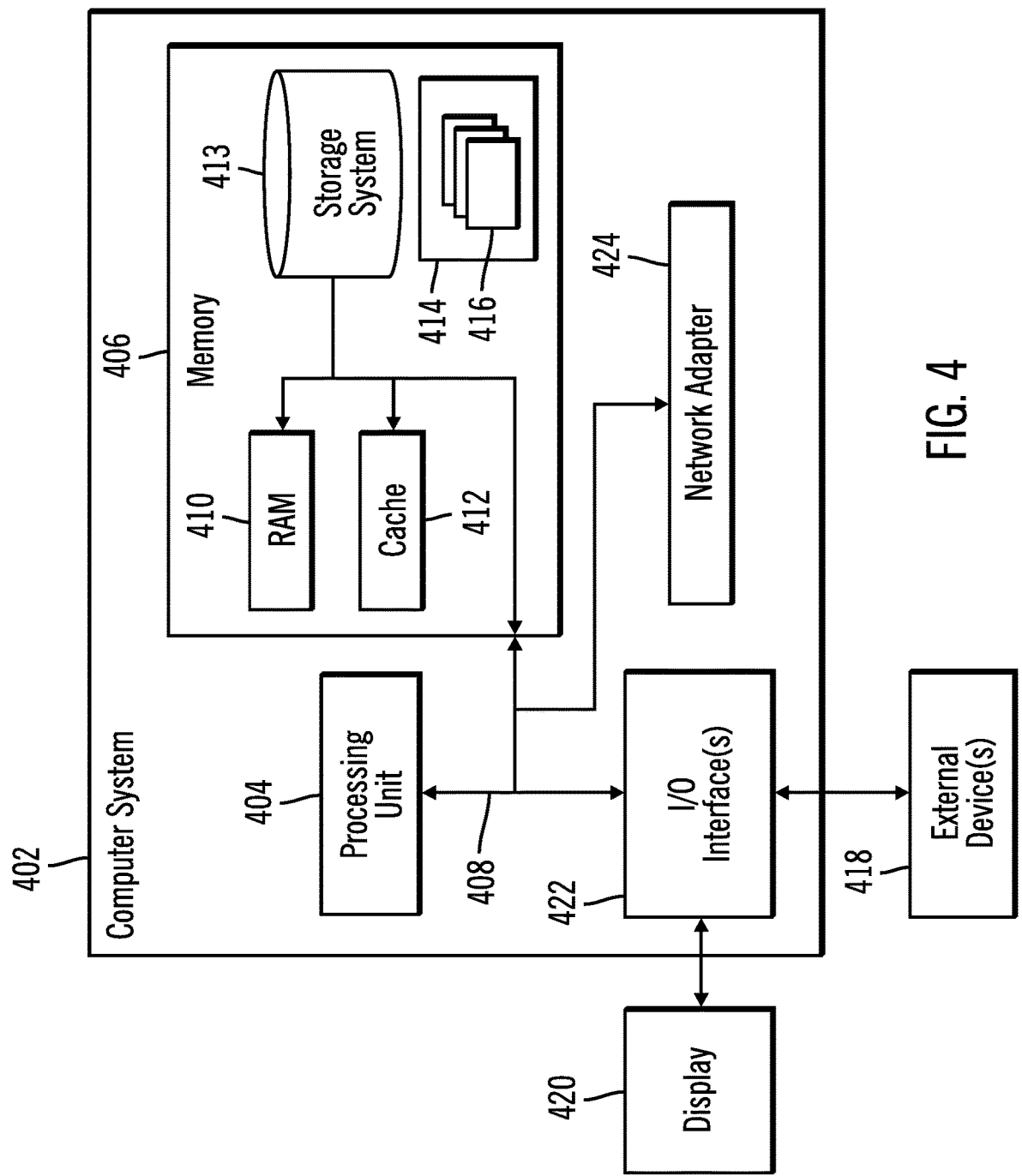
FIG. 4 illustrates a computing environment in which the components of FIG. 1 may be implemented.

The computational components of FIG. 1, including the servers $200_1$, $200_2$, $200_H$ may be implemented in one or more computer systems, such as the computer system 402 shown in FIG. 4. Computer system/server 402 may be described in the general context of computer system executable instructions, such as program modules, being executed by a computer system. Generally, program modules may include routines, programs, objects, components, logic, data structures, and so on that perform particular tasks or implement particular abstract data types. Computer system/server 402 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, the computer system/server 402 is shown in the form of a general-purpose computing device. The components of computer system/server 402 may include, but are not limited to, one or more processors or processing units 404, a system memory 406, and a bus 408 that couples various system components including system memory 406 to processor 404. Bus 408 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 402 typically includes a variety of computer system readable media. Such media may be any available media that is accessible by computer system/server 402, and it includes both volatile and non-volatile media, removable and non-removable media.

System memory 406 can include computer system readable media in the form of volatile memory, such as random access memory (RAM) 410 and/or cache memory 412. Computer system/server 402 may further include other removable/non-removable, volatile/non-volatile computer system storage media. By way of example only, storage system 413 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 408 by one or more data media interfaces. As will be further depicted and described below, memory 406 may include at least one program product having a set (e.g., at least one) of program modules that are configured to carry out the functions of embodiments of the invention.

Program/utility 414, having a set (at least one) of program modules 416, may be stored in memory 406 by way of example, and not limitation, as well as an operating system, one or more application programs, other program modules, and program data. Each of the operating system, one or more application programs, other program modules, and program data or some combination thereof, may include an implementation of a networking environment. The components of the computer 402 may be implemented as program modules 416 which generally carry out the functions and/or methodologies of embodiments of the invention as described herein. The systems of FIG. 1 may be implemented in one or more computer systems 402, where if they are implemented in multiple computer systems 402, then the computer systems may communicate over a network.

Computer system/server 402 may also communicate with one or more external devices 418 such as a keyboard, a pointing device, a display 420, etc.; one or more devices that enable a user to interact with computer system/server 402; and/or any devices (e.g., network card, modem, etc.) that enable computer system/server 402 to communicate with one or more other computing devices. Such communication can occur via Input/Output (I/O) interfaces 422. Still yet, computer system/server 402 can communicate with one or more networks such as a local area network (LAN), a general wide area network (WAN), and/or a public network (e.g., the Internet) via network adapter 424. As depicted, network adapter 424 communicates with the other components of computer system/server 402 via bus 408. It should be understood that although not shown, other hardware and/or software components could be used in conjunction with computer system/server 402. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for verifying mirroring of source data units to target data units, wherein the computer program product comprises a computer readable storage medium having program instructions executable by a processor to cause operations, the operations comprising:
  mirroring source data units in a source storage to corresponding target data units in a target storage;
  reading the source data units to compare to corresponding mirrored target data units;
  saving, in source version data, read source data units that did not match the corresponding target data units read from the target storage;
  rereading source data units that were read and did not match the corresponding target data units; and
  verifying the mirroring of the source data units in response to determining that for the mirrored source data units, one of the reread source data units and the read source data units saved in the source version data match the corresponding target data units read from the target storage.

2. The computer program product of claim 1, wherein additional iterations of the rereading of the source data units and saving the reread source data units in the source version data are performed while there are reread source data units that did not match corresponding target data units, wherein the operations further comprise:
  indicating the mirroring as unverified in response to determining that all of the source data units did not match the corresponding target data units after a predetermined number of iterations of the rereading and the saving the reread source data units.

3. The computer program product of claim 2, wherein the source data units are updated and mirrored to the corresponding target data units during the additional iterations of the rereading and the saving the reread source data units.

4. The computer program product of claim 1, wherein the operations further comprise:
   maintaining a verification map indicating the source data units whose mirroring was verified; and
   indicating in the verification map that the mirroring for a read source data unit of the source data units was verified in response to determining that the read source data unit or source data unit saved in the source version data matches a corresponding target data unit, wherein the mirroring of the source data units is verified in response to the verification map indicating that all of the source data units match the read source data unit or a version of the source data unit saved in the source version data.

5. The computer program product of claim 1, wherein the source data units are mirrored to the corresponding target data units in consistency groups that are consistent as of point-in-times, wherein verifying the mirroring of a source data unit comprises comparing a corresponding target data unit with one of the reread source data units and the source data units saved in the source version data at a same point-in-time as the corresponding target data unit.

6. The computer program product of claim 1, wherein the operations further comprise:
   saving, in target version data, target data units that did not match corresponding read source data units, wherein the verifying the mirroring of the source data units comprises verifying the mirroring of the source data units in response to determining that for a mirrored source data unit, one of a read source data unit and a reread source data unit saved in the source version data matches one instance of a corresponding target data unit in the target storage and the target version data.

7. The computer program product of claim 1, wherein source data units are mirrored to the corresponding target data units in consistency groups that are consistent as of point-in-times, wherein verifying the mirroring of a source data unit comprises comparing a corresponding target data unit of a specified point-in-time to one of the reread source data units and the read source data units saved in the source version data having the specified point-in-time.

8. A system for verifying mirroring of source data units to target data units, comprising:
   a processor; and
   a computer readable storage medium having program instructions executable by the processor to cause operations, the operations comprising:
      mirroring source data units in a source storage to corresponding target data units in a target storage;
      reading the source data units to compare to corresponding mirrored target data units;
      saving, in source version data, read source data units that did not match the corresponding target data units read from the target storage;
      rereading source data units that were read and did not match the corresponding target data units; and
      verifying the mirroring of the source data units in response to determining that for the mirrored source data units, one of the reread source data units and the read source data units saved in the source version data match the corresponding target data units read from the target storage.

9. The system of claim 8, wherein additional iterations of the rereading of the source data units and saving the reread source data units in the source version data are performed while there are reread source data units that did not match corresponding target data units, wherein the operations further comprise:
   indicating the mirroring as unverified in response to determining that all of the source data units did not match the corresponding target data units after a predetermined number of iterations of the rereading and the saving the reread source data units.

10. The system of claim 9, wherein the source data units are updated and mirrored to the corresponding target data units during the additional iterations of the rereading and the saving the reread source data units.

11. The system of claim 8, wherein the operations further comprise:
    maintaining a verification map indicating the source data units whose mirroring was verified; and
    indicating in the verification map that the mirroring for a read source data unit of the source data units was verified in response to determining that the read source data unit or source data unit saved in the source version data matches a corresponding target data unit, wherein the mirroring of the source data units is verified in response to the verification map indicating that all of the source data units match the read source data unit or a version of the source data unit saved in the source version data.

12. The system of claim 8, wherein source data units are mirrored to the corresponding target data units in consistency groups that are consistent as of point-in-times, wherein verifying the mirroring of a source data unit comprises comparing a corresponding target data unit with one of the reread source data units and the read source data units saved in the source version data at a same point-in-time as the corresponding target data unit.

13. The system of claim 8, wherein the operations further comprise:
    saving, in target version data, target data units that did not match corresponding read source data units, wherein the verifying the mirroring of the source data units comprises verifying the mirroring of the source data units in response to determining that for a mirrored source data unit, one of a read source data unit and a reread source data unit saved in the source version data matches one instance of a corresponding target data unit in the target storage and the target version data.

14. The system of claim 8, wherein source data units are mirrored to the corresponding target data units in consistency groups that are consistent as of point-in-times, wherein verifying the mirroring of a source data unit comprises comparing a corresponding target data unit of a specified point-in-time to one of the reread source data units and the read source data units saved in the source version data having the specified point-in-time.

15. A method for verifying mirroring of source data units to target data units, comprising:
    mirroring source data units in a source storage to corresponding target data units in a target storage;
    reading the source data units to compare to corresponding mirrored target data units;
    saving, in source version data, read source data units that did not match the corresponding target data units read from the target storage;
    rereading source data units that were read and did not match the corresponding target data units; and verifying the mirroring of the source data units in response to determining that for mirrored source data units, one of the reread source data units and the read source data units saved in the source version data match the corresponding target data units read from the target storage.

16. The method of claim 15, wherein additional iterations of the rereading of the source data units and saving the reread source data units in the source version data are performed while there are reread source data units that did not match corresponding target data units, further comprising:

indicating the mirroring as unverified in response to determining that all of the source data units did not match the corresponding target data units after a predetermined number of iterations of the rereading and the saving the reread source data units.

17. The method of claim 16, wherein the source data units are updated and mirrored to the corresponding target data units during the additional iterations of the rereading and the saving the reread source data units.

18. The method of claim 15, further comprising:

maintaining a verification map indicating the source data units whose mirroring was verified; and indicating in the verification map that the mirroring for a read source data unit of the source data units was verified in response to determining that the read source data unit or source data unit saved in the source version data matches a corresponding target data unit, wherein the mirroring of the source data units is verified in response to the verification map indicating that all of the source data units match the read source data unit or a version of the source data unit saved in the source version data.

19. The method of claim 15, wherein source data units are mirrored to the corresponding target data units in consistency groups that are consistent as of point-in-times, wherein verifying the mirroring of a source data unit comprises comparing a corresponding target data unit with one of the reread source data unit and the read source data units saved in the source version data at a same point-in-time as the corresponding target data unit.

20. The method of claim 15, further comprising:

saving, in target version data, target data units that did not match corresponding read source data units, wherein the verifying the mirroring of the source data units comprises verifying the mirroring of the source data units in response to determining that for a mirrored source data unit, one of a read source data unit and a reread source data unit saved in the source version data matches one instance of a corresponding target data unit in the target storage and the target version data.

\* \* \* \* \*